(12) United States Patent
Bintz et al.

(10) Patent No.: US 7,330,631 B2
(45) Date of Patent: Feb. 12, 2008

(54) ELECTRO-OPTIC POLYMER WAVEGUIDE DEVICES INCORPORATING ORGANICALLY MODIFIED SOL-GEL CLADS

(75) Inventors: Louis J. Bintz, Bothell, WA (US); Raluca Dinu, Redmond, WA (US); Danliang Jin, Bothell, WA (US)

(73) Assignee: Lumera Corporation, Bothell, WA (US)

( * ) Notice: Subject to any disclaimer, the term of this patent is extended or adjusted under 35 U.S.C. 154(b) by 0 days.

(21) Appl. No.: 11/685,629

(22) Filed: Mar. 13, 2007

(65) Prior Publication Data

US 2007/0154161 A1   Jul. 5, 2007

Related U.S. Application Data

(63) Continuation of application No. 10/341,828, filed on Jan. 14, 2003, now Pat. No. 7,206,490, which is a continuation-in-part of application No. 10/299,155, filed on Nov. 19, 2002, now Pat. No. 6,937,811.

(51) Int. Cl.
*G02B 6/00* (2006.01)

(52) U.S. Cl. ................. 385/143; 385/145; 385/129

(58) Field of Classification Search ............ 385/8, 385/9, 14, 129–132, 141–145
See application file for complete search history.

(56) References Cited

U.S. PATENT DOCUMENTS

| | | | |
|---|---|---|---|
| 5,120,339 A | 6/1992 | Markovich et al. |
| 5,133,037 A | 7/1992 | Yoon et al. |
| 5,170,161 A | 12/1992 | Sakurai |
| 5,198,513 A | 3/1993 | Clement et al. |
| 5,219,788 A | 6/1993 | Abernathey et al. |
| 5,223,356 A | 6/1993 | Kumar et al. |
| 5,370,969 A | 12/1994 | Vidusek |
| 5,433,895 A | 7/1995 | Jeng et al. |
| 5,480,687 A | 1/1996 | Heming et al. |
| 5,497,445 A | 3/1996 | Imoto |
| 5,635,576 A | 6/1997 | Foll et al. |
| 5,714,304 A | 2/1998 | Gibbons et al. |
| 5,776,374 A | 7/1998 | Newsham et al. |
| 5,783,319 A | 7/1998 | Reisfeld et al. |
| 5,811,507 A | 9/1998 | Chan et al. |
| 5,861,976 A | 1/1999 | Hoekstra |
| 5,887,116 A | 3/1999 | Grote |
| 6,002,828 A | 12/1999 | Hult et al. |

(Continued)

FOREIGN PATENT DOCUMENTS

EP   0961139   12/1999

(Continued)

OTHER PUBLICATIONS

Bailey et al., "Step and flash imprint lithography: Template surface treatment and defect analysis," *J. Vac. Sci. Technol. B*, 2000, 18(6):3572-3577.

(Continued)

*Primary Examiner*—Kevin S. Wood
(74) *Attorney, Agent, or Firm*—Fish & Richardson P.C.

(57) ABSTRACT

A method including poling an optical waveguide device including an optical waveguide core, an electrode, and an organically modified sol-gel layer.

19 Claims, 6 Drawing Sheets

U.S. PATENT DOCUMENTS

| | | | |
|---|---|---|---|
| 6,019,906 | A | 2/2000 | Jang et al. |
| 6,031,945 | A | 2/2000 | You et al. |
| 6,126,867 | A | 10/2000 | Kanitz et al. |
| 6,229,949 | B1 | 5/2001 | Ido et al. |
| 6,294,573 | B1 | 9/2001 | Curtin et al. |
| 6,303,730 | B1 | 10/2001 | Fries et al. |
| 6,306,563 | B1 | 10/2001 | Xu et al. |
| 6,323,361 | B1 | 11/2001 | Wu et al. |
| 6,335,149 | B1 | 1/2002 | Xu et al. |
| 6,419,989 | B1 | 7/2002 | Betz et al. |
| 6,466,707 | B1 | 10/2002 | Dawes et al. |
| 6,473,551 | B2 | 10/2002 | Norwood et al. |
| 6,895,162 | B2 * | 5/2005 | Bintz et al. ............ 385/142 |
| 7,076,134 | B2 * | 7/2006 | Nippa et al. ............ 385/40 |
| 7,215,851 | B2 * | 5/2007 | Nippa et al. ............ 385/40 |
| 2001/0041025 | A1 | 11/2001 | Farahi |
| 2004/0113296 | A1 * | 6/2004 | Bintz et al. ............ 264/1.27 |

FOREIGN PATENT DOCUMENTS

| | | |
|---|---|---|
| JP | 04238305 | 8/1992 |
| JP | 09258151 | 10/1997 |
| JP | 10048443 | 2/1998 |
| JP | 10232323 | 9/1998 |
| JP | 2001235640 | 8/2001 |
| JP | 2001255426 | 9/2001 |

OTHER PUBLICATIONS

Chen et al., "Thermosetting Polyurethanes with Stable and Large Second-Order Optical Nonlinearity," *Macromolecules*, 1992, 25:4032-4035.

Grote et al., "Effect of conductivity and dielectric constant on the modulation voltage for optoelectronic devices based on nonlinear optical polymers," *Opt. Eng.*, 2001, 40(11):2464-2473.

Ma et al., "A Novel Class of High-Performance Perfluorocyclobutane-Containing Polymers for Second-Order Nonlinear Optics," *Chem. Mater.*, 2000, 12:1187-1189.

Ma et al., "Highly Efficient and Thermally Stable Nonlinear Optical Dendrimer for Electrooptics," *J. Am. Chem. Soc.*, 2001, 123:986-987.

Mao et al., "Progress toward Device-Quality Second-Order Nonlinear Optical Materials. 1. Influence of Composition and Processing Conditions on Nonlinearity, Temporal Stability, and Optical Loss," *Chem. Mater.*, 1998, 10:146-155.

Oh et al., "Electro-optic polymer modulators for 1.55 μm wavelength using phenyltetraene bridged chromophore in polycarbonate," *Appl. Phys. Lett.*, 2000, 76(24):3525-3527.

Resnick et al., "Release Layers for Contact and Imprint Lithography," *Semicon. Int.*, Jun. 2002, online version, 7 pgs.

\* cited by examiner

*a*

*b*

*c*

*d*

ELECTRO-OPTIC POLYMER WAVEGUIDE DEVICES INCORPORATING ORGANICALLY MODIFIED SOL-GEL CLADS

CROSS-REFERENCE TO RELATED APPLICATIONS

This application is a continuation under 35 U.S.C. § 120, which claims priority to U.S. application Ser. No. 10/341,828, filed Jan. 14, 2003, and issued on Apr. 17. 2007, as U.S. Pat. No. 7,206,490, which is a continuation-in-part under 35 U.S.C. § 119 that claims the benefit of U.S. application 10/299,155, filed Nov. 19, 2002, and issued on Aug. 30, 2005, as U.S. Pat. No. 6,937,811. The disclosures of the prior applications are considered part of (and are incorporated by reference in) the disclosure of this application.

BACKGROUND OF THE INVENTION

All patents, patent applications, and publications cited within this application are incorporated herein by reference to the same extent as if each individual patent, patent application or publication was specifically and individually incorporated by reference.

This application is a continuation-in-part of patent application Ser. No. 10/299,155 filed Nov. 19, 2002, entitled "Polymer Waveguide Devices Incorporating Electro-optically Active Polymer Clads," which is assigned to the same assignee as the present application, and which is hereby incorporated by reference.

The invention relates generally to the field of electro-optic polymer waveguide devices. The art of electro-optic polymer waveguide devices and the use of organic second order nonlinear optical polymers in such devices is well documented. A typical electro-optic polymer waveguide, which is illustrated as a cross-sectional view in FIG. 1, is comprised of: 1) an electro-optic polymer core (5), 2) a first polymer clad (10) overlying the electro-optic polymer core (5); 3) a second polymer clad (15) underlying the electro-optic polymer core (5); 4) a top electrode (20) overlying the first polymer clad (10); 5) a bottom electrode (25) underlying the second polymer clad (15); and 6) a substrate (30).

In a typical electro-optic polymer waveguide, the total thickness of the core, first clad, and second clad is around 6-10 µm. Typically, the refractive indices of the polymer clads are chosen to confine a great majority of the optical field in the electro-optic polymer core and keep the optical field from contacting the metal electrodes. The resulting mode in the waveguide is elliptical to such an extent that unacceptably high insertion results when the waveguide is butt-coupled to an optical fiber. The insertion loss can be reduced by using tapers to adjust the size of the fiber mode to the size of the waveguide mode. However, such tapers can be difficult to manufacture.

Making the waveguide mode less elliptical can also reduce insertion loss. A less elliptical waveguide mode can be achieved by decreasing the difference in refractive indices between the clads and electro-optic core. However, such an approach may lead to the optical field contacting one or both of the electrodes, which may cause increased optical loss or complete loss of mode confinement. Such a problem may be overcome by adding lower refractive index clads to act as barriers between the first and second clads and metal electrodes.

Proper conductivity in the clads of an electro-optic device during poling is also advantageous. It is known in the art that insulating properties of some polymers detract from their use as passive clads in electro-optic polymer modulators since some conductivity in clads is necessary during poling of the electro-optic polymer. See, for example, Grote et al., *Opt. Eng.*, 2001, 40(11), 2464-2473.

SUMMARY OF THE INVENTION

At the elevated temperatures required for poling, organically modified sol-gels (e.g., organically modified titania-siloxane sol-gels) have desirable conductivity values (e.g., on the order of $10^{10}$ to $10^{11}$ ohm-cm$^{-1}$). Thus, an electro-optic waveguide device is described that includes an electro-optic polymer core having a refractive index and a polymer buffer clad that comprises an organically modified sol-gel. The refractive index of the buffer clad is lower than the refractive index of the core. The waveguide may further include: (a) an additional polymer buffer clad (e.g., comprising a crosslinked acrylate polymer) having a refractive index that is lower than the refractive index of the electro-optic polymer core; (b) a first polymer clad (e.g., comprising a crosslinked acrylate polymer) between the electro-optic polymer core and the additional polymer buffer clad, and having a refractive index that is lower than the refractive index of the electro-optic polymer core but higher than the refractive index of the polymer buffer clad that comprises the organically modified sol-gel; and (c) a second polymer clad between the electro-optic polymer core and the polymer buffer clad comprising the organically modified sol-gel, the second polymer clad having a refractive index that is lower than the refractive index of the electro-optic polymer core but higher than the refractive index of the polymer buffer clad comprising the organically modified sol-gel. Each layer may be deposited directly on the preceding layer. Alternatively, individual pairs of layers may be separated by a thin (e.g., less than about 0.1 µm or so) adhesion promoter, surface promoter, primer layer, or the like.

As used herein, a "buffer clad" is the outermost layer from the core of the waveguide and has a refractive index sufficiently low to keep the optical mode from contacting electrodes that would cause optical loss (e.g., gold electrodes).

The organically modified sol-gel clads increase the power efficiency of the device since the electro-optic polymer core can be more efficiently poled. Additionally, the structure also decreases optical insertion loss since the propagating mode is both less elliptical due to the presence of the buffer clads, and does not contact the metal electrodes due to the buffer clads.

Other features and advantages will be apparent from the following description of the preferred embodiments, and from the claims.

DETAILED DESCRIPTION

In one embodiment, an electro-optic waveguide device comprises an electro-optic polymer core and an electro-optic first polymer clad in proximity to the electro-optic polymer core, the electro-optic first polymer clad having a refractive index that is lower than the refractive index of the electro-optic polymer core. The electro-optic first polymer clad increases the power efficiency of the device since some of the propagating mode resides in the first polymer clad. Both the electro-optic core polymer layer and the electro-optic clad polymer layer can be formed by methods known to those skilled in the art such as spin-coating, dip-coating, brushing, and printing.

Figure 3:
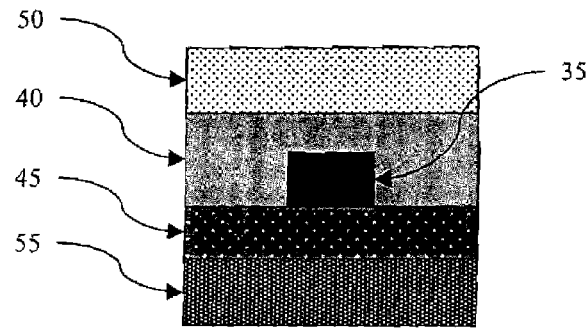
FIG. 3 is a cross-sectional view of various electro-optic core configurations in the polymer stack.
Figure 3:
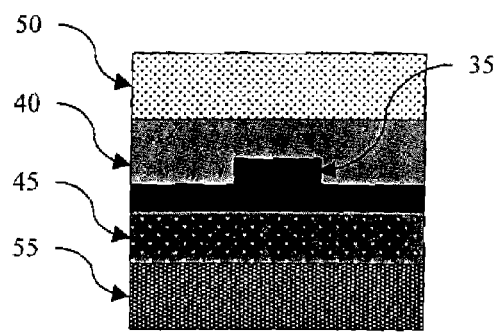
Figure 3:
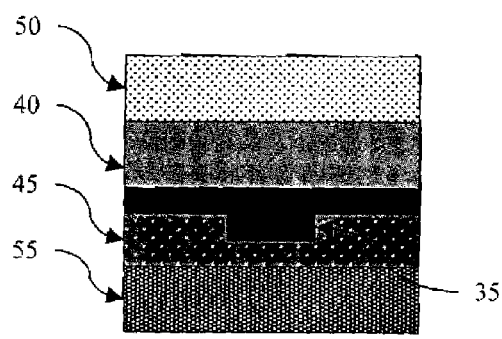
Figure 3:
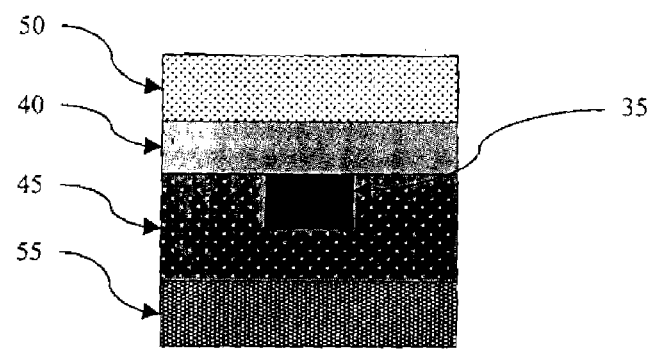

In general, an electro-optic polymer comprises a second order nonlinear optical chromophore and a polymer matrix. In some embodiments, the chromophore can be covalently attached to the polymer backbone. The electro-optic core can be poled by any one of the techniques known to those skilled in the art including corona poling, electrode poling, or push-pull poling. The electro-optic core can be shaped by reactive ion etching, laser ablation, bleaching, positive tone photolithography, negative tone photolithography, or embossing. Referring to FIG. 3, the electro-optic core can be shaped as a "rib" (FIG. 3a), a "quasi-rib" (FIG. 3b), a "quasi-trench" (FIG. 3c), or a "buried-trench" (FIG. 3d). Preferably, the electro-optic device is a Mach Zehnder modulator, a directional coupler, or a micro-ring resonator.

Figure 1:
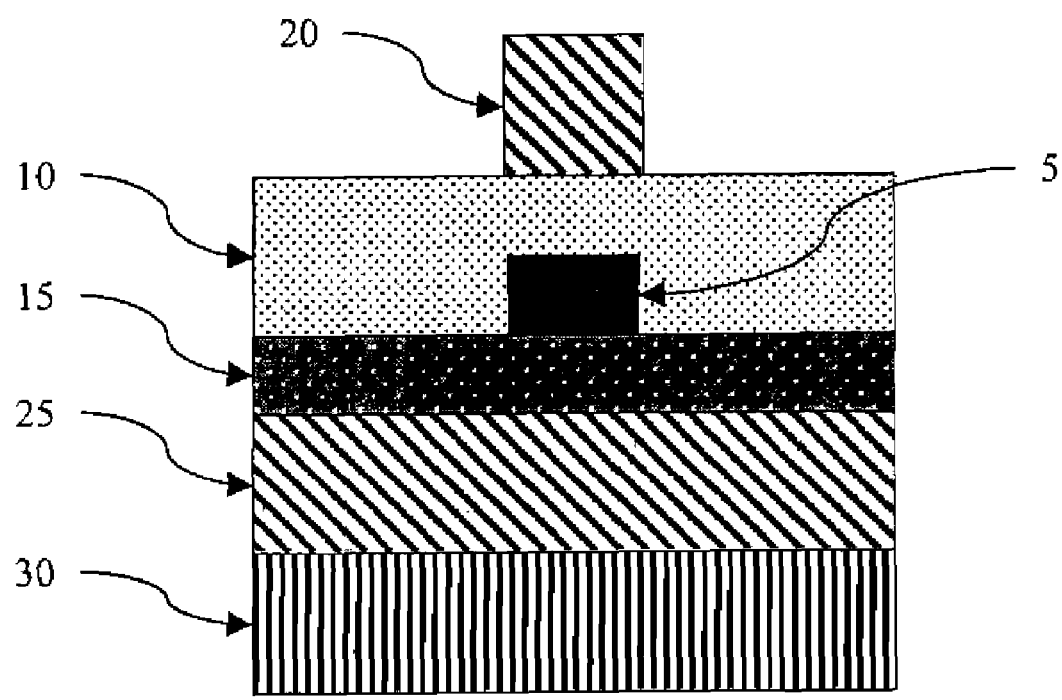
FIG. 1 illustrates a typical prior art electro-optic polymer waveguide device.
Figure 2:
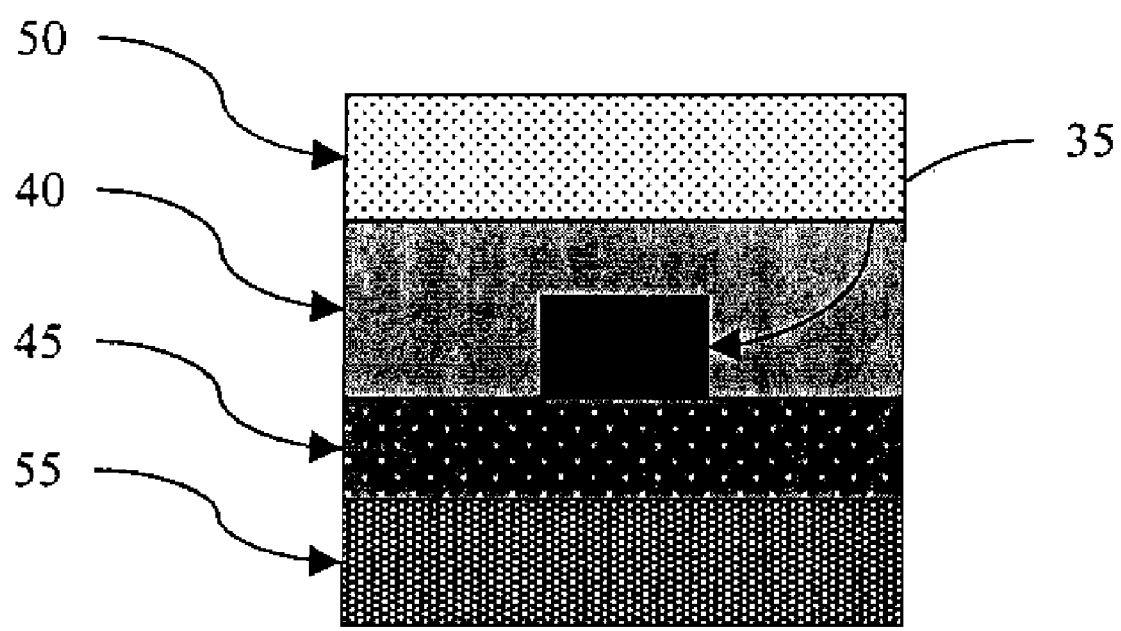
FIG. 2 is a cross-sectional view of one embodiment of an electro-optic polymer waveguide device.

In a preferred embodiment, the electro-optic waveguide device comprises, referring to FIG. 2: 1) an electro-optic polymer core (35); 2) an electro-optic first polymer clad (40) in proximity to the electro-optic polymer core, the electro-optic first polymer clad having a refractive index that is lower than the refractive index of the electro-optic polymer core; 3) a second polymer clad (45) in proximity to the electro-optic polymer core, the second polymer clad having a refractive index that is lower than the refractive index of the electro-optic polymer core; 4) a first polymer buffer clad (50) in proximity to the electro-optic first polymer clad, the first polymer buffer clad having a refractive index that is lower than the refractive index of the electro-optic first polymer clad; and 5) a second polymer buffer clad (55) in proximity to the second polymer clad, the second polymer buffer clad having a refractive index that is lower than the refractive index of the second polymer clad. The electro-optic polymer core, electro-optic first polymer clad, second polymer clad, first polymer buffer clad, and second polymer buffer clad can each be formed independently by methods known to those skilled in the art such as spin-coating, dip-coating, brushing, and printing. In another embodiment, the second polymer clad is an electro-optic polymer or, preferably, a crosslinked electro-optic polymer.

Figure 4:
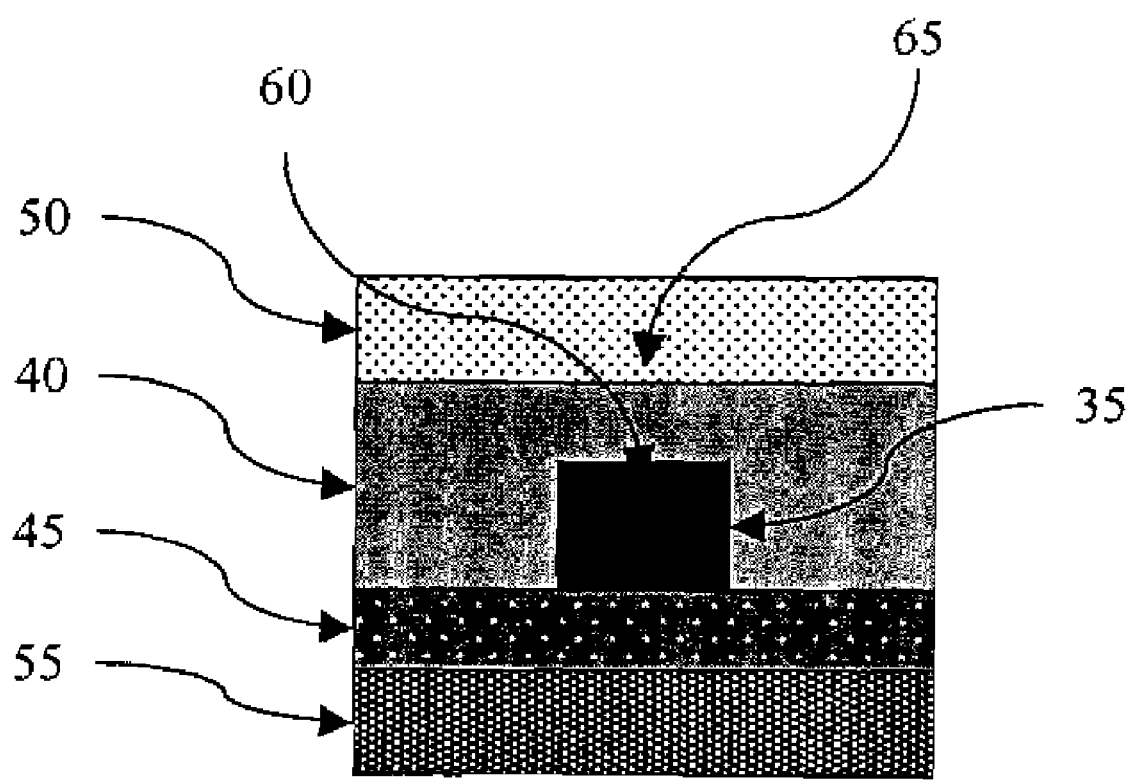
FIG. 4 is a cross-sectional view of another embodiment of an electro-optic polymer waveguide device.

In another embodiment, the electro-optic waveguide device comprises, referring to FIG. 4: 1) an electro-optic polymer core (35); 2) an electro-optic first polymer clad (40) in proximity to the electro-optic polymer corce the electro-optic first polymer clad having a refractive index that is lower than the refractive index of the electro-optic polymer core; 3) a first polymer buffer clad (50) in proximity to the electro-optic first polymer clad, the first polymer buffer clad having a refractive index that is lower than the refractive index of the electro-optic first polymer clad; and 4) a second polymer buffer clad (55) in proximity to the electro-optic polymer core, the second polymer buffer clad having a refractive index that is lower than the refractive index of the electro-optic polymer core. The electro-optic polymer core, electro-optic polymer first clad, first polymer buffer clad, and second polymer buffer clad can each be formed independently by methods known to those skilled in the art such as spin-coating, dip-coating, brushing, and printing.

The refractive index and thickness of each polymer layer is chosen so that the resulting waveguide has single mode behavior. The refractive index of each layer, thickness of each clad, and the dimensions of the core that would give single mode behavior in the resulting waveguide can be calculated using techniques and computer programs known to those skilled in the art (such as the BeamProp Version 5.0 software from Rsoft). Preferable ranges for the thickness and the refractive index of the various layers are summarized in Table 1. Preferably, referring to FIG. 2, the electro-optic core (35) is shaped as a rib and has a thickness of about 2.4-about 3.8 µm and a refractive index of about 1.54-about 1.62, the electro-optic first polymer clad (40) has a thickness between the electro-optic core surface (60) and the electro-optic first polymer clad surface (65) of about 1.0-about 3.0 µm and a refractive index of about 1.53-about 1.61, the second polymer clad (45) has a thickness of 0-about 3.0 µm and a refractive index of about 1.53-about 1.61, the first polymer buffer clad (50) has a thickness of about 2.2-about 3.2 µm and a refractive index of about 1.445-about 1.505, and the second polymer buffer clad has a thickness of about 2.2-about 3.2 µm and a refractive index of about 1.445-about 1.505. The preferable ranges for refractive index, layer thickness, and core dimensions for the various layers are given below in Table 1.

TABLE 1

| Layer | Thickness (µm) | Width (µm) | Refractive Index |
|---|---|---|---|
| First Polymer Buffer Clad | 2.2-3.2 | — | 1.445-1.505 |
| First Polymer Clad | 1.0-3.0 | — | 1.53-1.61 |
| Core | 2.4-3.8 | 2.8-4.2 | 1.54-1.62 |
| Second Polymer Clad | 0-3.0 | — | 1.53-1.61 |
| Second Polymer Buffer Clad | 2.2-3.2 | — | 1.445-1.505 |

In another embodiment, the electro-optic core is crosslinked, the electro-optic first polymer clad is crosslinked, the second polymer clad is an organically modified sol-gel (ORMOSIL), the first polymer buffer clad is a radiation-cured acrylate, and the second polymer buffer clad is an organically modified sol-gel. Crosslinkable electro-optic polymers, sol-gels, ORMOSILs, and radiation cured acrylates are known to those skilled in the art, for example see U.S. Pat. Nos. 6,419,989; 6,335,149; 6,323,361; 6,306,563; 6,303,730; 6,294,573; 6,126,867; 6,002,828; 5,811,507; 5,783,319; 5,776,374; 5,635,576; 5,714,304; 5,480,687; 5,433,895; 5,223,356; and 5,120,339; *Chem. Mater.* 2000, 12, 1187; *J. Am. Chem. Soc.* 2001, 123, 986; *Macromolecules* 1992, 25, 4032; and *Chem. Mater.* 1998, 10, 146. Preferably, the second polymer clad comprises an organically modified titania-siloxane sol-gel.

Figure 5:
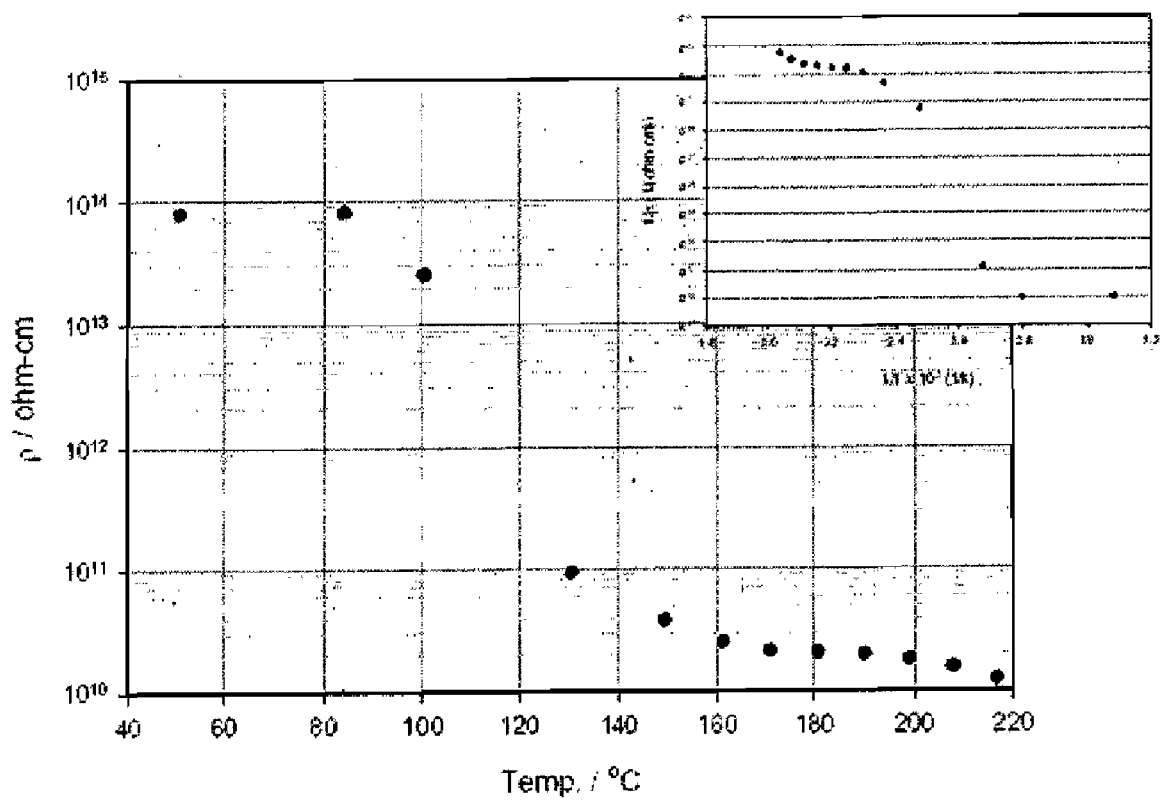
FIG. 5 is a graph of resistivity vs. temperature for an organically modified sol gel used as a buffer clad.

The ORMOSILs are particularly useful as buffer clads, with or without additional polymer clads, because at the elevated temperatures required for poling, they have desirable conductivity values ($10^{10}$ to $10^{11}$ ohm-cm$^{-1}$), with the transition occurring around 100° C., as shown in FIG. 5. In addition, these materials enable refractive index tunability based on their flexibility of composition. For example, replacing aliphatic groups such as methyl groups with more polarizable groups such as phenyl groups on the silicon atoms of an ORMOSIL or an organically modified titania-siloxane sol-gel will increase the refractive index. Increasing the fraction of titania will also increase the refractive index. Thus, one embodiment is an electro-optic waveguide device comprising an electro-optic polymer core and a polymer buffer clad, wherein the polymer buffer clad comprises an organically modified sol gel and has a refractive index that is lower than the refractive index of the electro-optic polymer core.

Figure 6:
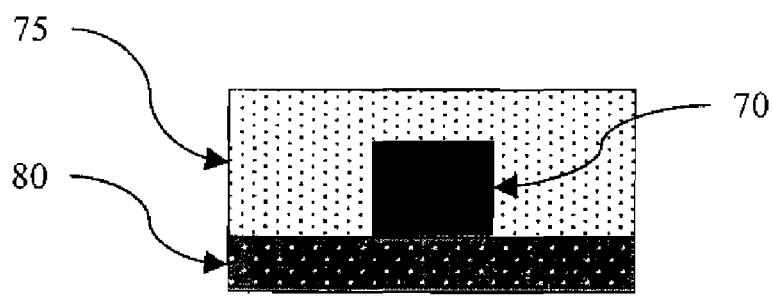
FIG. 6 is a cross-sectional view of various embodiments of an electro-optic waveguide device.
Figure 6:
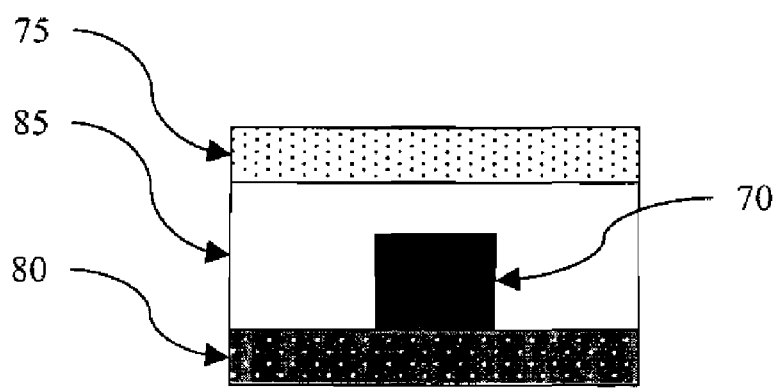
Figure 6:
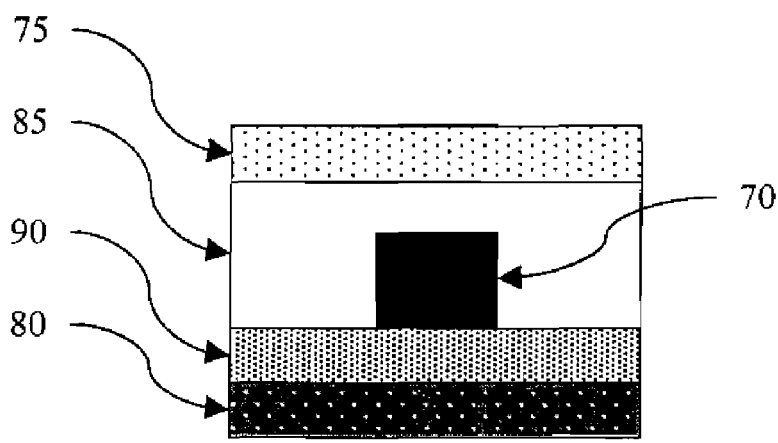

Preferably, as shown in FIG. 6, the electro-optic waveguide device comprises a first polymer buffer clad (75), an electro-optic core (70), and a second polymer buffer clad (80) wherein one polymer buffer clad comprises an organically modified sol-gel, and each of the buffer clads has a refractive index that is lower than the refractive index of the electro-optic polymer core. Suitable materials for the other polymer buffer clad include crosslinked acrylate polymers, e.g., of the type described in Oh et al., *Appl. Phys. Lett.* 2000, 76(24), 3525-3527. The device may also further include a first polymer clad (85) between the core (70) and first buffer clad (75). The first polymer clad (85) has a refractive index that is lower than the refractive index of the core (70), but higher than the refractive index of first buffer clad (75). Preferably, the first polymer clad comprises a crosslinked acrylate polymer.

In a another embodiment, the first polymer buffer clad has a thickness of about 2.2 to about 3.2 µm and a refractive index of about 1.445 to about 1.505, the first polymer clad has a thickness of about 1.0 to about 3.0 µm and a refractive index of about 1.53 to about 1.61, the electro-optic polymer core has a thickness of about 2.4 to about 3.8 µm and a refractive index of about 1.54 to about 1.62, and the second polymer buffer clad has a thickness of about 2.2 to about 3.2 µm and a refractive index of about 1.445 to about 1.505.

In another embodiment, the electro-optic waveguide device further comprises a second polymer clad between the electro-optic polymer core and the second polymer clad, the second polymer clad having a refractive index that is lower than the refractive index of the electro-optic polymer core and higher than the refractive index of the second polymer buffer clad. Preferably, the second polymer clad comprises an organically modified sol-gel, more preferably an organically modified titania-siloxane sol-gel.

Preferably, the first polymer buffer clad has a thickness of about 2.2 to about 3.2 µm and a refractive index of about 1.445 to about 1.505; (b) the first polymer clad has a thickness of about 1.0 to about 3 µm and refractive index of about 1.53 to about 1.61; (c) the electro-optic polymer core has a thickness of about 2.4 to about 3.8 µm and a refractive index of about 1.54 to about 1.62; (d) the second polymer clad has a thickness of about 1.0 to about 3.0 µm and a refractive index of about 1.53 to about 1.61; and (e) the second polymer buffer clad has a thickness of about 2.2 to about 3.2 µm and a refractive index of about 1.445 to about 1.505.

Preferably, in all embodiments, the electro-optic polymer core (70) comprises a crosslinked polymer (e.g., a crosslinked acrylate polymer). Preferably, the electro-optic waveguide device further comprises a substrate on which the polymer buffer clad comprising an organically modified sol-gel is deposited. In some embodiments, the substrate is silicon.

The optical waveguide devices described herein can be used in optical communications systems. The optical communications systems employing such modulators will be improved due to the increased power efficiency of the waveguide devices. Thus, other embodiments of the invention include communications systems such as beam steering systems, phased array radars, optical routers, optical transponders, and optical satellites.

EXAMPLES

The following example(s) is illustrative and does not limit the claims.

The preparation of materials used in the following examples is given below:

Electro-Optic Polymers;

The electro-optic chromophore used in the electro-optic core and electro-optic clad was prepared by esterifying a chromophore containing free alcohol groups with the required equivalents of 4-(trifluorovinyloxy)-benzoyl chloride (the benzoyl chloride is described in U.S. Pat. No. 5,198,513) and a hindered amine base or pyridine.

The polymer used as a matrix for the electro-optic chromophore was prepared by reacting 1-lithio-4-trifluovinyloxybenzene with pentafluorostyrene at −78° C. for 1 h followed by warming to room temperature. The resulting 2,3,5,6-fluoro-4'-trifluorovinyloxy-4-vinyl biphenyl was purified by column chromatography and polymerized with AIBN initiation in THF under $N_2$ atmosphere. The polymer was purified by precipitation from THF/hexanes.

Polymers for the Second Buffer Clad and/or Second Polymer Clad:

Polymer (1): an organically modified titania-siloxane sol-gel was prepared by: 1) dripping 127.2 g of titanium butoxide (from Aldrich, double distilled) into a solution of 592 g of anhydrous ethanol and 24.0 g of concentrated DCl (~37 wt %); 2) dripping 94.3 g of $D_2O$; 3) dripping 99.2 g of glycidoxypropyltrimethoxysilane; 4) heating at ~80° C. for 12 hours; 5) dripping 372.0 g of phenyltriethoxysilane (from Aldrich, distilled) while at ~80° C. for 4 hours; and 6) adding distilled 473 g of cyclohexanone into the solution and stir to homogeneity. The low boiling volatiles from the reaction were removed by rotary evaporation. Finally, 1.60 g of poly[dimethylsiloxane-co-methyl(3-hydroxypropyl) siloxane]-graft-poly(ethylene/-propylene glycol) (from Aldrich, used as received) was added into the above solution and stirred to obtain a homogeneous solution.

Polymer (2): an organically modified sol-gel was prepared by: 1) adding 156.0 g tetraethyl orthosilicate (from Aldrich, double distilled), 531.0 g glycidoxypropyltrimethoxysilane (from Aldrich, double distilled), 321.0 g cyclohexanone (from Aldrich, distilled) to a flask; 2) dripping a solution of 187.5 g $D_2O$ and 7.50 g 2M DCl; and 3) heating at 80-100° C. for 5 hours.

Polymer (3): an organically modified sol-gel was prepared by 1) adding 17.83 g methyltriethoxysilane (from Aldrich, double distilled), 70.80 g glycidoxypropyltrimethoxysilane (from Aldrich, double distilled), 64.2 g cyclohexanone (from Aldrich, distilled) to a flask; 2) dripping a solution of 21.78 g $D_2O$ and 2.050 g 2M DCl; and 3) heating at 80-100° C. for 5 hours.

Polymers for the First Polymer Clad and First Polymer Buffer Clad:

Polymer (4): a crosslinkable acrylate polymer was prepared by: 1) stirring 20.0 g of pentaerythritol tetraacrylate (Aldrich, used as received) and 20.0 g tri(ethylene glycol) dimethacrylate (Aldrich, used as received), 2) adding 1.2 g of 2-methyl-4'-(methylthio)-2-morpholinopropiophenone and stirring until dissolution; and 3) refrigerating the resulting solution.

Polymer (5): another crosslinkable acrylate polymer was prepared by: 1) adding to a two-liter flask with mechanical stirring 400.0 g Bisphenol A glycerolate diacrylate (Aldrich, used as received), 70.4 g tri(ethylene glycol) dimethacrylate (Aldrich, used as received), and 552 g 2-ethoxyethanol (Aldrich, distilled), and stirring either overnight or for 12 hours to obtain a homogeneous solution; and 2) introducing 4.704 g 2-methyl-4'-(methylthio)-2-morpholinopropiophenone into the solution, and stirring to effect complete dissolution.

Example 1

The device in this example was fabricated using a gold covered $SiO_2$ 6-inch wafer as a substrate. The refractive indices reported are measured at 1550 nm.

An adhesion promoter for the second polymer buffer clad and gold was prepared by: 1) heating 100.0 g of isopropyl alcohol (from Aldrich), 2.0 g of $H_2O$, 5.0 g of mercaptopropyltriethoxysilane (from Sigma, distilled) and 5.0 g of mercaptopropylmethyl-dimethoxysilane, and two drops of 37% HCl at reflux for 2 hours; 2) allowing the solution cool down to room temperature; 3) adding 504 g of isopropyl alcohol to the above solution and stirring. The adhesion promoter was applied to the gold surface by spin depositing a 1% solution at 500 rpm for 2 seconds and 4500 rpm for 30 seconds.

The second polymer buffer clad (Polymer (2)) was spin deposited as a 36.1% (by weight) solution in cyclopentanone at 300 rpm for 12 seconds and 1050 rpm for 20 seconds. The wafer layer was cured by heating under 50 Torr of vacuum at 100° C. for 60 min (heating rate of 0.5° C./min), 150° C. for 60 min (heating rate of 3° C./min), and 200° C. for 30 min (heating rate of 5° C./min), and cooling the wafer to ambient temperature at a cooling rate of 0.5° C./min. The thickness of the layer is 2.9 μm and the refractive index is 1.475.

The second polymer clad (Polymer (1)) was spin deposited on the second polymer buffer clad as a 38% (by weight) solution in cyclohexanone at 500 rpm for 5 seconds and 2900 rpm for 30 seconds. The clad was cured by heating under 50 Torr of vacuum at 100° C. for 60 min (heating rate of 0.5° C./min), 150° C. for 60 min (heating rate of 3° C./min), and 190° C. for 90 min (heating rate of 5° C./min), and cooling the wafer to ambient temperature at a cooling rate of 0.5° C./min. The thickness of the layer was 1.9 μm and the refractive index was 1.545.

An adhesion promoter layer was applied to the second polymer clad by spin depositing a 1% (by weight) solution of (N-(2-aminoethyl)-3-aminopropylmethyl-dimethoxysilane) in isopropyl alcohol at 500 rpm for 5 sec and 3000 rpm for 30 sec. The wafer was then heated on a hot plate at 100° C. for 5 min.

The polymer used for the electro-optic core was spin deposited on the second polymer clad as a 30% (by total solids weight) solution of the electro-optic chromophore in the polymer matrix (the chromophore concentration with respect to the crosslinkable polymer was 25% by weight) in cyclopentanone at 300 rpm for 2 sec then 500 rpm for 5 sec, then 1000 rpm for 20 sec. The film was precured by heating at 80° C. on a hot plate for 10 min, heating at 70° C. at 1 mTorr for 480 min. The film was corona poled and crosslinked by applying a voltage of 4.5 kV to the wafer while heating to 180° C. over 10 min, holding at 4.5 kV at 180° C. for 10 min, increasing the corona voltage to 7.5 kV and holding at 180° C. for 10 min, and cooling to ambient temperature over 25 min. Heating at 180° C. was necessary to affect the desired amount of crosslinking. The thickness of the layer was 3.0 μm and the refractive index was 1.565.

The electro-optic polymer core was formed as a rib using a hardmask and dry etching as described in commonly assigned, co-pending U.S. application Ser. No. 10/264,461. The electro-optic polymer core was formed as a Mach-Zehnder Modulator.

The polymer used for the electro-optic first polymer clad was spin deposited on the electro-optic core and the second polymer clad as a 23% (by total solids weight) solution of the electro-optic chromophore in the polymer matrix (the chromophore concentration with respect to the crosslinkable polymer was 21% by weight) in cyclopentanone at 300 rpm for 2 sec then 500 rpm for 5 sec, then 1400 rpm for 20 sec. The film was precured by heating at 50° C. on a hot plate for 10 min., followed by heating at 25 Torr for 8 h at 50° C. The film was corona poled and crosslinked by applying a voltage of 7.5 kV to the wafer while heating at 180° C. for 20 min. The thickness of the layer was 1.2 μm and the refractive index was 1.55.

The first polymer buffer clad (Polymer (4)) was spin deposited on the electro-optic first polymer clad as a liquid at 500 rpm for 5 seconds and 1800 rpm for 40 seconds. The wafer was then exposed to UV radiation until the film was hardened. The thickness of the layer was 3.1 μm and the refractive index was 1.495.

The surface of the first polymer buffer clad was treated with oxygen/neon plasma for 7 min. in order to promote adhesion of a gold layer. The gold layer was deposited and the gold electrode was defined over one arm of the Mach-Zehnder modulator by photolithography and wet etching. The wafer was diced into individual Mach-Zehnder electro-optic devices.

Example 2

The device in this example was fabricated using a gold-covered $SiO_2$, 6-inch wafer as a substrate. The second polymer buffer clad, second polymer clad, and the electro-optic polymer core were the same as those used in Example 1. The refractive indices reported are measured at 1550 nm.

The electro-optic polymer core was formed as a rib using a hardmask and dry etching as described in commonly assigned, co-pending U.S. application Ser. No. 10/264,461. The electro-optic polymer core was formed as a Mach-Zehnder modulator.

The surface of the stack was treated with oxygen plasma for 1 min. in a DRIE at a working pressure of 230 mTorr to promote adhesion of the subsequently deposited first polymer buffer clad.

A 24% by weight solution of the first polymer clad (Polymer (5)) was spin deposited at 300 rpm for 30 sec and 1000 rpm for 20 sec. The film was dried at 50° C. at 1 mTorr for 1 hour, and then exposed to ultraviolet radiation until the film was hardened. The thickness of the layer was 2 μm and the refractive index was 1.543.

The surface of the first polymer clad was treated with an oxygen/neon plasma in a DRIE at a working pressure of 20 mTorr for 5 min. to promote adhesion of the first polymer buffer clad. The first polymer buffer clad and top electrode were the same as those provided in Example 1, and were deposited using the procedure described in Example 1.

Other embodiments are within the following claims.

What is claimed is:

1. A method, comprising: poling an optical waveguide device, wherein the optical waveguide device comprises an optical waveguide core including an organic chromophore and a polymer, at least one electrode, and an organically modified sol-gel layer between the electrode and the optical waveguide core, wherein the poling induces electro-optic activity in the optical waveguide core.

2. The method of claim 1, wherein the optical waveguide core comprises a crosslinked polymer.

3. The method of claim 1, wherein the chromophore is covalently attached to the polymer backbone of the optical waveguide core.

4. The method of claim 1, wherein poling comprises corona poling.

5. The method of claim 1, wherein poling comprises electrode poling.

6. The method of claim 1, wherein poling comprises push-pull poling.

7. The method of claim 1, further comprising shaping the optical waveguide core.

8. The method of claim 7, wherein shaping comprises reactive ion etching.

9. The method of claim 7, wherein shaping comprises laser ablation.

10. The method of claim 7, wherein shaping comprises bleaching.

11. The method of claim 7, wherein shaping comprises positive or negative tone photolithography.

12. The method of claim 7, wherein shaping comprises embossing.

13. The method of claim 1, wherein the optical waveguide device further comprises a substrate.

14. The method of claim 1, wherein the optical waveguide device further comprises a polymer buffer clad.

15. The method of claim 1, wherein the optical waveguide device further comprises a second electrode and a second organically modified sol-gel layer between the second electrode and the optical waveguide core.

16. The method of claim 15, wherein the optical waveguide device further comprises a first polymer buffer clad and a second polymer buffer clad.

17. The method of claim 1, wherein the sol-gel layer has a refractive index that is lower than the refractive index of the core.

18. The method of claim 1, wherein the sol-gel layer has a resistivity of $10^{11}$ ohm·cm$^{-1}$ or less.

19. The method of claim 1, wherein the sol-gel layer decreases in resistivity by at least three orders of magnitude from room temperature to poling temperature.

* * * * *